(12) United States Patent
Li et al.

(10) Patent No.: US 11,009,185 B2
(45) Date of Patent: May 18, 2021

(54) METHOD AND SYSTEM OF DISPENSING LIQUEFIED GAS

(71) Applicants: CHINA ENERGY INVESTMENT CORPORATION LIMITED, Beijing (CN); NATIONAL INSTITUTE OF CLEAN-AND-LOW-CARBON ENERGY, Beijing (CN)

(72) Inventors: Xianming Jimmy Li, Mountain View, CA (US); Jeff Pickles, Mountain View, CA (US); Edward Youn, Mountain View, CA (US); Jeff Allen, Mountain View, CA (US); Anthony Ku, Mountain View, CA (US); Cullen Hall, Mountain View, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 0 days.

(21) Appl. No.: 16/576,904

(22) Filed: Sep. 20, 2019

(65) Prior Publication Data

US 2020/0158288 A1     May 21, 2020

Related U.S. Application Data

(60) Provisional application No. 62/768,150, filed on Nov. 16, 2018.

(51) Int. Cl.
*F17C 7/04*     (2006.01)
(52) U.S. Cl.
CPC .......... *F17C 7/04* (2013.01); *F17C 2221/012* (2013.01); *F17C 2221/033* (2013.01);
(Continued)

(58) Field of Classification Search
CPC ................ F17C 7/04; F17C 2227/0135; F17C 2270/0142; F17C 2265/065;
(Continued)

(56) References Cited

U.S. PATENT DOCUMENTS 5,243,821 A    9/1993  Schuck et al.
5,762,119 A    6/1998  Platz et al.
(Continued)

FOREIGN PATENT DOCUMENTS

CN    206191267 U    5/2017
DE    102007040087 A1    2/2009
(Continued)

OTHER PUBLICATIONS

International Search Report and Written Opinion in corresponding PCT Application No. PCT/CN2019/117319, dated Jan. 23, 2020.

*Primary Examiner* — Marina A Tietjen

(57) ABSTRACT

A method for dispensing liquefied fuel, the method including: providing a non-petroleum fuel as a liquefied fuel to a storage tank; increasing pressure of the liquefied fuel to a target pressure using a pump disposed within the storage tank, where a first portion of the liquefied fuel is bypassed around or at least partially around a heat exchanger, and a second portion of the liquefied fuel is discharged to the heat exchanger, where the heat exchanger is configured to warm the second portion of the liquefied fuel. A dispenser is provided that incorporates a control system that allows coordinated fueling of one or more vehicles simultaneously, where the heat exchanger uses only the fuel itself without external refrigeration to manage final dispensing temperature and the fueling station does not include a storage subsystem disposed between the pump and the dispenser.

14 Claims, 1 Drawing Sheet

(52) U.S. Cl.
CPC .......... *F17C 2227/0135* (2013.01); *F17C 2227/0393* (2013.01); *F17C 2265/065* (2013.01); *F17C 2270/0142* (2013.01)

(58) Field of Classification Search
CPC .......... F17C 2221/012; F17C 2221/033; F17C 2227/0393; F17C 2250/034; F17C 2227/0178; F17C 2223/0115; F17C 2223/0161; F17C 2223/033; F17C 2223/036; F17C 2225/0115; F17C 2225/0123; F17C 2225/036; F17C 2227/0302; F17C 2250/043; F17C 2250/0439; F17C 2250/0443; F17C 2265/022; F17C 2270/0139; F17C 2227/0311; F17C 2227/0304; F17C 5/06; F17C 5/007; F17C 7/02; F17C 13/00; F17C 2223/013; F17C 2223/035; F17C 2227/0185; F17C 2227/0309; F17C 2250/032; F17C 2250/0694; F17C 2265/061; Y02E 60/32
See application file for complete search history.

(56) References Cited

U.S. PATENT DOCUMENTS

| | | | |
|---|---|---|---|
| 6,481,218 | B1 | 11/2002 | Drelser |
| 6,619,336 | B2 | 9/2003 | Cohen et al. |
| 8,069,885 | B2 | 12/2011 | Kederer et al. |
| 9,383,063 | B2 | 7/2016 | Gupta et al. |
| 2002/0157402 | A1 | 10/2002 | Drube et al. |
| 2008/0115508 | A1* | 5/2008 | Kotzot ............ F17C 9/02 62/50.2 |
| 2008/0216913 | A1 | 9/2008 | Kederer et al. |
| 2012/0159970 | A1 | 6/2012 | Reese et al. |

FOREIGN PATENT DOCUMENTS

| | | |
|---|---|---|
| DE | 102011109824 A1 | 2/2013 |
| DE | 102016009672 A1 | 2/2018 |
| EP | 2175187 A2 | 4/2010 |
| JP | 2012167767 A | 9/2012 |
| WO | 2015048420 A1 | 4/2015 |

\* cited by examiner

METHOD AND SYSTEM OF DISPENSING LIQUEFIED GAS

CROSS REFERENCE TO RELATED APPLICATIONS

This application claims the benefit of U.S. provisional application No. 62/768,150, filed Nov. 16, 2018, titled "METHOD AND SYSTEM OF DISPENSING LIQUEFIED GAS," which is incorporated herein by reference.

FIELD

The present invention relates to a method and system of dispensing liquefied gas, and more particularly, to a method and system of dispensing liquefied hydrogen gas or liquefied natural gas.

BACKGROUND

Most of the current hydrogen refueling stations use a gaseous hydrogen supply which is expensive to transport and difficult to scale up to larger stations or networks of stations due to maintenance and capital costs. For example, gas compression in general, and hydrogen compression in particular, is energy intensive. Compressors used in current hydrogen refueling stations (HRS) are limited in size and contribute to one-third to 40% of the station's maintenance costs. Additionally, since compression raises the hydrogen temperature, cooling is required before filling a vehicle. Even with a high-pressure cascade of storage vessels, hydrogen precooling is required to produce a filling speed comparable to gasoline or diesel filling. The cascade of storage vessels also requires a large footprint and large capital investment. For the minority of stations that use liquid hydrogen, the liquid only reduces the transportation cost. Once the liquid hydrogen is transported to the HRS, it is handled similarly to a gaseous supply because vaporization is the first step in the dispensing process.

For example, U.S. Pat. No. 6,619,336 B2 discloses a refueling method called a density fill. The system includes gas compressors, cooling means, high pressure storage vessels, and control means. This system is typical of the current state of the art. It also epitomizes the challenges the industry faces in scaling up hydrogen refueling infrastructure to meet demand, mainly, gas compression being energy intensive, precooling by refrigeration adding complexity and cost, cascade storage vessels increasing the footprint and capital investment, and gaseous supply being simply not scalable logistically.

US 2012/0159970 A1 discloses a method of filling a storage vessel. The method allows the pumping of liquid hydrogen followed by vaporizing the high-pressure liquid to gas, or vaporizing the liquid hydrogen followed by compressing the warmed gas. In either case, a set of high-pressure storage vessels are provided downstream where these storage vessels are immersed in a heat exchange bath. The heat exchange bath is actively managed with a recirculating pump and cooling or heating means to maintain a temperature. Enclosing the bulky cascade storage system inside a bath, however, is expensive and even more complicated to manage than the traditional cascade storage system.

DE 102016009672 A1 discloses a mobile refueling system using stored liquid hydrogen and a method to use the cold boiled-off gas to cool the vacuum jacketed piping. U.S. Pat. No. 8,069,885 (US 2008/0216913 A1) manages the boiled-off gas by feeding the boiled-off gas to a fuel cell which provides power to the control system and compressor on the mobile fueler, making it a self-sufficient unit without hydrogen venting. U.S. Pat. No. 5,243,821 discloses a compressor system that consumes the boiled-off gas from the vapor space of the storage tank as well as the boiled-off gas during startup. This reciprocating compressor system has elaborate control schemes to manage pump blowback. In fact, this compressor system has so much heat leak that it ices over and freezes after several hours of operation. A redundant compressor is included to provide uninterrupted customer supply while deicing of the compressor system takes place.

None of the compressor systems cited in the prior art, however, provide a viable solution to meet the frequent on and off duty cycles required by a typical fueling station, or provide ways to minimize heat leak and boil-off.

U.S. Pat. No. 6,481,218 discloses a means to pump liquid hydrogen with a slave tank which is in fluid communication with the main storage tank. The fluid level in the slave tank is determined by hydraulic head and the heat effect in the slave tank due to pumping and heat leak. Several displacement pumps are used in the slave tank, all connected to a swashplate drive that converts rotating motion from an electric motor to reciprocating motion for the pistons. The slave tank is used because of the need to keep the pumps constantly cooled at the expense of system simplicity and the extra heat leak due to the additional surface area of the slave tank. To minimize heat leak, DE 102007040087 A1 discloses a material selection criterion for the pump cylinder which, desirably, should be strong and insulating. Unfortunately, such materials are yet known.

U.S. Pat. No. 9,383,063 discloses a method of dispensing hydrogen from a liquid hydrogen (LH2) tank without any compressor or pump by using volume expansion from vaporization as the pressure building mechanism. The LH2 storage tank is isolated from the high-pressure downstream fueling circuit. A small pump may be used in a pressure-building circuit on the LH2 tank to feed the LH2 to the downstream high-pressure fueling circuit. The embodiments heavily rely on cryo-compressed pressure vessels which are very costly. Without pressurizing the LH2 storage tank to substantial pressure or venting the high-pressure circuit significantly, there is no practical way to feed LH2 to the high-pressure fueling circuit. Neither condition is desirable. Again, this design is incapable of meeting an operating scenario where multiple fills are required in a short period of time.

U.S. Pat. No. 5,762,119 discloses a mobile unit to deliver high pressure gas where the gas is stored in its liquefied state to maximize capacity. A vaporizer followed by a warm gas compressor converts the stored liquid into a high-pressure gas for customer use. Liquid pumping, although mentioned in passing, has no specific implementation.

SUMMARY

Therefore, one of objects of this invention is to provide an improved dispensing method for liquefied fuel, e.g., gas, suitable for large scale infrastructure development by addressing issues such as liquid pumping efficiency, heat leak, boiloff, frequent on and off duty cycle in a typical hydrogen refueling station, and meeting the dispensing temperature and pressure targets, from a systems perspective. Another object of this invention is to design a refueling station with improved safety and reliability.

In one embodiment of the invention, a method of dispensing liquefied fuel is provided, the method including: providing a liquefied fuel to a storage tank; providing a pump disposed within the storage tank, wherein, the pump is configured to increase the pressure of the liquefied fuel to a desired target, and the discharge end of the pump is in fluid communication with a heat exchanger that warms up the fuel, wherein the heat exchanger is configured to control the final temperature of the fuel for vehicle filling; providing a dispenser that incorporates a control system that allows coordinated fueling of one or more vehicles simultaneously, where the heat exchanger uses only the fuel itself to manage final dispensing temperature and the fueling station is further characterized by the absence of a storage subsystem disposed between the pump and the dispenser.

A second embodiment of the invention provides a method of dispensing non-petroleum fuel, the method including: providing a non-petroleum fuel as a liquified fuel to a storage tank; increasing pressure of the liquefied fuel to a target pressure using a pump disposed within the storage tank; bypassing a first portion of the liquefied fuel from the pump around or at least partially around a heat exchanger; discharging a second portion of the liquefied fuel to a heat exchanger, said heat exchanger configured to warm the second portion of the liquefied fuel; and controlling a temperature of the liquefied fuel to be dispensed to a vehicle by combining the first portion and the second portion of the liquefied fuel without external refrigeration or a storage subsystem disposed between the pump and the dispenser.

A third embodiment of the invention provides a system for dispensing liquefied gas, the system comprising: a liquefied gas storage tank configured to be buried underground in dirt without a bunker, wherein, the storage tank has access, safety, instrumentation, and product supply and withdrawal through a consolidated flange at the top of the tank; a pump disposed within the storage tank and made a part of the tank through a mounting mechanism, wherein, the pump is configured to increase the pressure of the liquefied gas to a desired target; a hydraulic drive system configured to actuate the pump, and permit the isolation of heat and vibration away from the liquefied gas storage tank; a heat exchanger configured to be in fluid communication with a discharge end of the pump, and to warm up the fluid; a thermal management system configured to use a cold stream bypassed from upstream of the heat exchanger to control the final temperature for vehicle filling; a dispenser with a control system, wherein the control system initiates vehicle fueling, and is configured to serve a plurality of vehicles simultaneously and in succession through a nozzle.

BRIEF DESCRIPTION OF THE DRAWINGS

The accompanying drawings are used to provide further understanding of the invention and constitute a part of the description. The accompanying drawings together with the following embodiments serve to explain the invention, but do not constitute a limitation to the invention. In the accompanying drawings.

Figure 1:
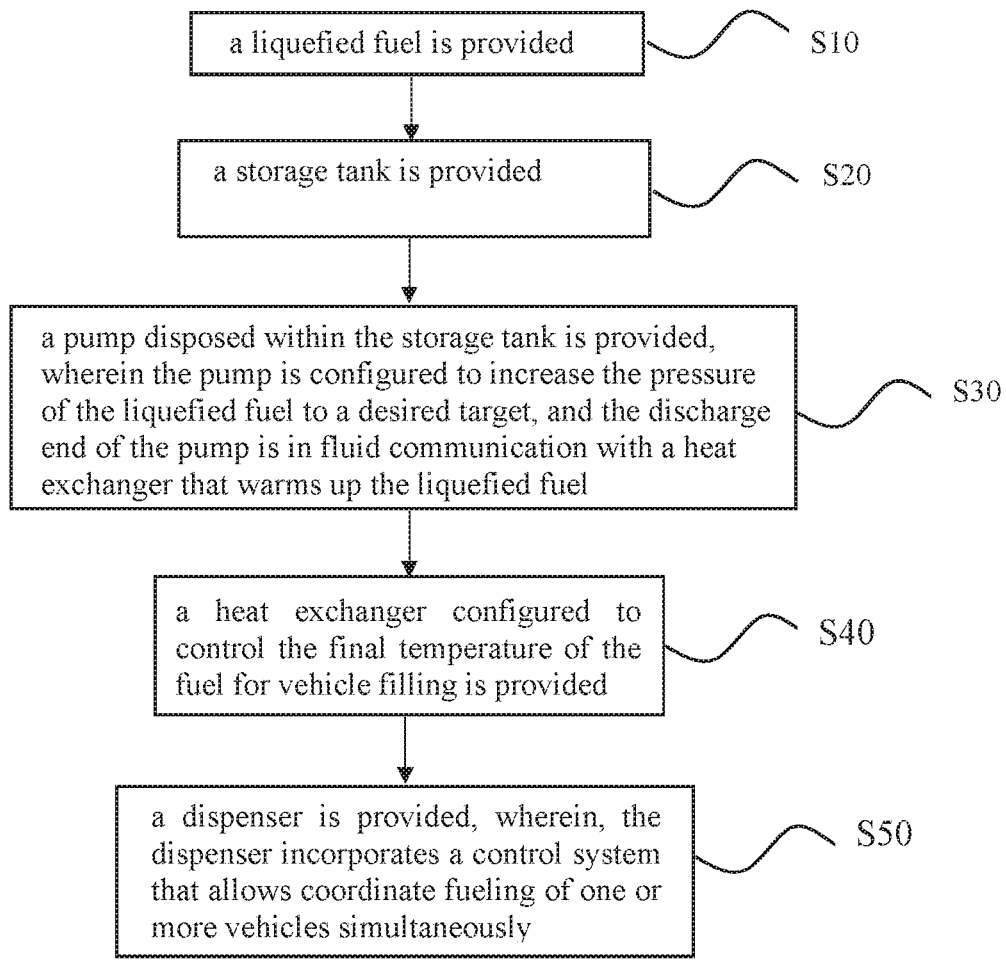
FIG. 1 is a flow chart of a method of dispensing fuel according to some embodiments of the present invention.

It should be noted that the drawing figures are not necessarily drawn to scale, or proportion, but instead are drawn to provide a better understanding of the components thereof, and are not intended to be limiting in scope, but rather provide exemplary illustrations.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two".

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein, "first," "second," "third," etc. are used to distinguish from among a plurality of steps and/or features, and is not indicative of the total number, or relative position in time and/or space unless expressly stated as such.

Illustrative embodiments of the present invention are described below. While the present invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

For the purposes of simplicity and clarity, detailed descriptions of well-known devices, circuits, and methods are omitted so as not to obscure the description of the present invention with unnecessary detail.

Those familiar with industrial gas supply readily recognize that most hydrogen supplied, for non-pipeline merchants use, is in liquid form and is transported from the production site to an intermediate point, known as a transfill station, because transporting hydrogen in liquid form is one of the only economic methods for transporting for long distances and in industry-relevant quantities. Merchant use is contrasted with captive use, where the former refers to hydrogen generated for sale, and the latter means hydrogen generated as an intermediate for a final product such as ammonia or fertilizer.

Although the majority of merchant use of hydrogen by volume is supplied via pipeline for large customers such as refineries, there are many smaller merchant use customers not on pipelines. For these customers, from the transfill station, the liquid hydrogen may be vaporized and filled into high pressure storage vessels on a tube trailer for delivery to the local customers. Liquid hydrogen can also be delivered directly from the production site to the end customer if the quantity justifies such an arrangement. Therefore, the supply costs of liquid hydrogen and gaseous hydrogen to the end customer are similar. In fact, direct liquid supply may be cheaper because it bypasses the transfill station step.

Although most current hydrogen refueling stations use gas compressors, which are adequate for small-scale demonstration phase applications, they are inherently more energy intensive than liquid pumping. For example, for an incompressible liquid such as liquid hydrogen, the power required to increase pressure from $p_1$ to $p_2$ at a flow rate of m is provided per the Bernoulli equation:

$$w = \frac{\dot{m}}{\rho}(p_1 - p_2) \qquad (1)$$

Where ρ is liquid density (70.8 kg/m³ for liquid $H_2$). For isothermal gas compression for an ideal gas such as, for illustrative purposes, gaseous hydrogen, the power requirement for the same amount of flow is:

$$w = \dot{m}\frac{R_u T}{M}\ln\frac{p_2}{p_1} \qquad (2)$$

Where $R_u$ is the universal gas constant (8.314 kJ/kmol/K), and M is the molar mass of the gas (M=2 for hydrogen). For adiabatic gas compression, the energy requirement is:

$$w = \dot{m}\frac{R_u T}{M}\frac{k}{k-1}\left[\left(\frac{p_2}{p_1}\right)^{\frac{k-1}{k}} - 1\right] \qquad (3)$$

Where k is the specific heat ratio (k=1.4 for hydrogen). The thermodynamically ideal energy requirements for raising liquid hydrogen or gaseous hydrogen from ambient pressure to an elevated pressure are in Table 1 as follows:

| End Pressure | MPa | 45 | 90 |
|---|---|---|---|
| Pumping liquid $H_2$ | kW (kWh/kg) | 42.3 (0.18) | 84.7 (0.35) |
| Isothermal gas compression | kW (kWh/kg) | 508 (2.1) | 566 (2.4) |
| Adiabatic gas compression | kW (kWh/kg) | 1376 (5.7) | 1741 (7.2) |

Note:
Assuming initial gas temperature at 300K.

Although isothermal gas compression is the most efficient method of raising gas pressure, pumping liquid is approximately 10 times more efficient. In reality, single stage gas compression generally follows adiabatic conditions, while multi-stage compression with inter-stage cooling operates somewhere between isothermal and adiabatic conditions. Accounting for mechanical and process inefficiencies, the overall system compression efficiency is somewhere between 50% (single stage) and 70% (multi-stage), therefore the actual compression energy requirement for gas compression is typically more than the adiabatic requirement.

Since the efficiency of pumping liquid is higher than gas compression, the present invention uses a pump to deliver liquefied fuel, for example, liquid hydrogen. After the liquid hydrogen is supplied to the HRS as contemplated in the present invention, it is stored in an underground storage tank. In the related art (e.g. U.S. Pat. No. 5,243,821), LH2 is stored in an above-ground tank because the LH2 is withdrawn with an external pump or compressor which requires a hydraulic head on the suction side. This requirement necessitates that the LH2 tank be placed at an elevation higher than the pump or compressor. Such external piping and control appendages make it impossible to bury the storage tank underground directly in the soil. The alternative is to construct an underground bunker as done by Air Products in Washington, D.C. or by Linde in a HRS in Munich, Germany. Such an underground bunker, however, is costly to construct and it is costly to maintain because it is a confined space. It is desirable to directly bury the tank underground.

Therefore, one of objects of this invention is to provide an improved dispensing method for liquefied gas, such as hydrogen, suitable for large scale infrastructure development by addressing issues such as liquid pumping efficiency, heat leak, boiloff, frequent on and off duty cycle, and meeting the dispensing temperature and pressure targets, from a systems perspective. Another object of this invention is to design a refueling station with improved safety and reliability.

For example, in one embodiment of the invention, during vehicle filling, the liquid hydrogen is pumped to a pressure consistent with the desired target dispensing pressure. For example, for 35 MPa fueling, up to 45 MPa pressure is attained to account for system pressure drop and control requirements. Due to compression and heat input by pump friction, the fuel at the pump discharge end at the dispenser is at approximately 40 K and 45 MPa. At this thermodynamic state, the fuel is a supercritical fluid (the critical point of hydrogen is 33.2 K and 1.31 MPa). The fuel is heated in a heat exchanger, e.g., via air or steam or electrical heater to near ambient conditions, e.g., the heat exchanger is a vaporizer. In this heating process, the fuel expands approximately 3 times in volume. For fueling at 70 MPa, the pump discharge condition is approximately at 50 K and 90 MPa, and the gas expansion through the vaporizer is approximately two times the initial liquid volume. In both examples, the pumping of the liquefied fuel requires a lower amount of energy than gas compression, is achieved in one stage, and requires no additional cooling equipment. Since liquid hydrogen requires only a 30% and 40% increase in density to reach 45 MPa and 90 MPa from the typical liquid hydrogen storage tank conditions, respectively, liquid hydrogen is effectively an incompressible fluid for pumping analysis purposes and maintains a temperature that can be utilized for subsequent cooling of the fuel stream.

In the prior art, where the HRS uses LH2 (e.g. US 2012/0159970 A1), LH2 is first vaporized, and then followed by warm-gas compression because most gas compressors require the inlet temperature to be −10° C. (263 K) or higher (see, e.g. EP 2175187 A2). Warm gas compression for hydrogen is particularly inefficient because of the low molecular weight and low viscosity of hydrogen. Multiple stages of compression are required to raise the typical LH2 storage tank pressure of approximately 1 MPa to the desired dispensing pressure level. Inter-stage cooling is also required which requires a cooling water supply. The required compressor system and its auxiliary equipment are complicated and costly. According to U.S. Pat. No. 5,243,821, LH2 is pumped or compressed to the desired target pressure but by an external machine. In all cases, the resulting high-pressure warm hydrogen is stored in a series of storage vessels, known as cascade tubes. Before the hydrogen is filled to the vehicle storage vessel, a refrigeration system is required to pre-cool the gas to approximately −40° C. (233 K) at the nozzle for efficient and safe fueling. It is apparent to those skilled in the art that the cooling potential of the LH2 is not being used. Instead, warm gas compression and cascade storage create the necessity for cooling that is satisfied by adding a cooling water system and a refrigeration system, further complicating the station design.

FIG. 1 illustrates a flowchart of some embodiments of the present invention for a method for dispensing a non-petroleum fuel to vehicles.

Initially, the method includes detecting the type of vehicle for refueling by a dispenser of the refueling station, e.g., RFID, wireless, IR sensor, QR Code, scanner, I/O module, etc., or inputted by the driver of the vehicle in a keypad or the like so that the required temperature and pressure for receiving a non-petroleum fuel are determined.

For example, the desired dispensing fuel temperature (e.g., fuel temperature setpoint) entering the vehicle is in the range of −50° C. to 30° C., preferably, in the range of −40° C. to 0° C., and most preferably, the desired dispensing fuel temperature entering the vehicle is in the range of −40° C. to −20° C., which is of course dependent on the type of non-petroleum fuel and the vehicle. The desired vehicle pressure is in the range of 20 MPa to 100 MPa, and is preferably in the range of 35 MPa to 70 MPa.

The method then includes steps 10-50 (S10-S50), as follows:

Step 10 (S10): a liquefied fuel is provided.

Step 20 (S20): an underground storage tank is provided.

Step 30 (S30): a pump disposed within the storage tank is provided, wherein the pump is configured to increase the pressure of the liquefied fuel to a desired target, and the discharge end of the pump is in fluid communication with a heat exchanger that is used to warm up the liquefied fuel.

Since the pump is installed inside the storage tank, and is submerged in the liquefied fuel, an inlet of the pump intake is submerged in the liquefied fuel in the storage tank and disposed substantially at the bottom of the storage tank, e.g., a submergible pump, the net positive suction head (NPSH) is guaranteed at all liquid levels. In addition, the arrangement reduces footprint, enhances safety due to the elimination of potential collision and puncture failures of the storage tank.

Step 40 (S40): a heat exchanger configured to control the final temperature of the fuel for vehicle filling is provided. For example, the heat exchanger can be a vaporizer that uses steam, gas, ambient air, or other heating source, or an electrical heater, to heat the liquefied fuel. It is understood that although the term vaporizer is used, the liquefied fuel can be vaporized to gas or remain in the same state but at elevated temperatures. In some embodiments of the present invention, the heating source used in the heat exchanger is from at least one stream of fuel bypassed from upstream of the heat exchanger that has been heated to above the final dispensing temperature of the fuel.

In some embodiments of the present invention, a cold stream is provided as a first portion of the fuel that bypasses the heat exchanger via a bypass line and control valve, either upstream or from an intermediary point in or along the heat exchanger, and is mixed with the outlet fuel from the heat exchanger. The resulting mixture of fuel is controlled to meet the desired nozzle temperature target for dispensing by passing the bypass stream around or at least partially around the heat exchanger. For example, the first portion of the fuel diverted in the bypass line can be a mixture of non-petroleum fuel having partial or no vaporization to help regulate temperature of the bypass stream. If the bypass stream is taken entirely upstream of the vaporizer, then the bypass stream has no vaporization and has a colder temperature. However, in order to increase the temperature of the bypass stream, the first portion can include liquefied fuel that has been at least partially vaporized in the heat exchanger, e.g., taken at a point-midway or along various points in the heat exchanger.

In some embodiments, after passing through the heat exchanger, the temperature of the second portion of the fuel is increased, while the pressure is unchanged. It is preferred that the temperature of the vaporized second portion of the fuel is in the range within 10-20° C. of the ambient temperature, e.g. −20° C. to 20° C.

When the fuel is liquid hydrogen, the fraction of the first portion of the fuel is in the range of 5% to 95%, such as 5%, 15%, 25%, 35%, 45%, 55%, 65%, 75%, 85%, 95%, preferably, in the range of 10% to 70%, such as 10%, 20%, 30%, 40% 50%, 60%, 70%; and most preferably, in the range of 15% to 40%, such as 15%, 20%, 25%, 26%, 27%, 29%, 30%, 40%.

When the non-petroleum fuel is, for example, liquid hydrogen, the temperature of the combined fuel stream is in the range of −60° C. to 20° C.

Step 50: a dispenser is provided, wherein, the dispenser incorporates a control system that allows coordinated fueling of one or more vehicles simultaneously at the desired dispensing temperature, pressure, and flow rate, e.g., in the range of −60° C. to 20° C. and 20 MPa to 100 MPa. The control system can include a controller that receives the input from the vehicle(s) to be refueled and controls the system accordingly.

In some embodiments of the invention, a thermal management system is provided for combining the first portion and the second portion of the fuel. For example, the thermal management system can include a controller that controls valves for controlling the first portion and/or the second portion of the fuel to be mixed in a mixer to form the combined fuel stream. Temperature and/or pressure sensors and/or flow meters can be used to control the desired dispenser temperature and pressure and flow rate by the dispenser. It is appreciated that the thermal management system only uses the fuel itself to manage the final desired dispensing temperature and the fueling station is further characterized by the absence of a storage subsystem disposed between the pump and the dispenser.

When the filling of the vehicle is close to being completed to the target density at the target pressure and temperature, before finishing the filling, all the cold fuel in the bypass line is allowed to equalize with the desired values of the dispensing system. Proper operation is handled at the end of the filling to depressurize the hose and disconnect it from the vehicle to minimize venting. For example, any remaining fuel in the lines is returned to the storage system or flushed with an appropriate inert gas, e.g., nitrogen, argon, etc.

In some embodiments of the present invention, the pump flow rate is at least 2 kg/minute, preferably at least 3 kg/min, and most preferably at least 4 kg/min In some embodiments of the present invention, when the pump flow rate is at least 3 kg/min, the number of vehicles that can be fueled sequentially is limited only by the available fuel storage capacity of the HRS.

In some embodiments of the present invention, when the pump flow rate is at least 2 kg/min, the heat exchanger is a recuperative type heat exchanger, for example, an aluminum core heat exchanger.

From the above steps, it is understood that the liquefied fuel is pumped and diverted using the submergible pump rather than a gas compressor, where based on the data of the Table 1, the energy consumption of the method of the present invention would be lower than gas compression systems.

In addition, since there is no additional refrigeration system and/or cascade storage tanks, the method provided by some embodiments of the present invention has reduced capital and operational costs, saves space, and eliminates water cooling requirements for multi-stage gas compressor systems. Further, since the refrigeration system and cascade storage tanks etc. are omitted, the maintenance cost is reduced, and the overall cost of dispensing fuel is lower with the present method.

In some embodiments of the present invention, the liquefied fuel is liquid hydrogen or liquefied natural gas.

In some embodiments of the present invention, when the liquefied fuel is hydrogen, the temperature of the fuel exceeds 0° C. at some point between the storage tank and the dispensing to the vehicle.

In some embodiments of the present invention, the underground storage tank is without a bunker. When the underground storage tank is without the bunker, in some embodiments of the present invention, the underground storage tank is buried in soil/sand/dirt, which further reduces capital costs, since the bunker is not required.

In some embodiments of the present invention, access, safety instrumentation, and fuel supply and withdrawal are provided by a consolidated flange at the top of the storage tank.

In some embodiments of the present invention, the pump flow rate and the heat exchanger capacity allow extended sequential refills.

Figure 2:
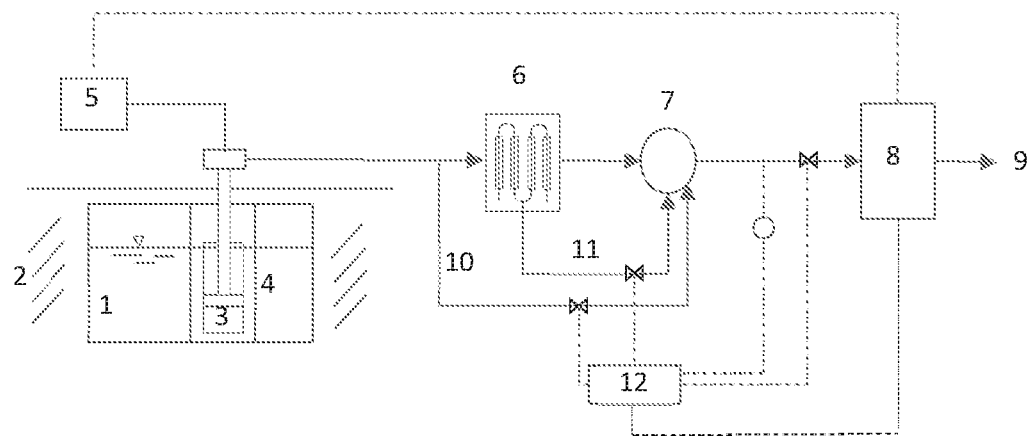
FIG. 2 is a system of dispensing fuel according to some embodiments of the present invention.

FIG. 2 illustrates a system for dispensing a fuel for vehicle fueling according to some embodiments of the present invention, the system can include the following:

At least one storage tank 1 configured to store liquified gas and is buried underground in dirt 2 without a bunker, wherein, the storage tank 1 is provided access and safety, has instrumentation, and product supply and withdrawal in a consolidated flange at the top of the storage tank. For example, the consolidated flange can include pressure and temperature sensors for monitoring the liquified fuel in the storage tank and a pump socket for housing at least one submergible pump having an inlet and/or outlet piped through the pump socket.

A submergible pump 3 is disposed within the storage tank 1 and can be made a part of the tank through a mounting mechanism, wherein, the pump 3 is configured to increase the pressure of the liquefied fuel to a desired target pressure. The mounting mechanism can include the pump socket 4 that has a structure for mounting the pump to the pump socket, e.g., bolts, compression mounting, foot valves, etc. for attaching the pump to the pump socket.

Since the submergible pump 3 is installed in the storage tank 1, and the storage tank 1 is buried underground in the dirt 2, the system has a reduced footprint, and enhanced safety due to the elimination of potential collision and puncture failures of the storage tank 1. In addition, since the suction end of the submergible pump 3 is substantially at the bottom of the liquefied gas tank, and the pump is submerged in the liquid, and is in fluid communication with the liquefied fuel, the net positive suction head (NPSH) is guaranteed at all liquid levels to maintain the pressure in the system.

In some embodiments of the present, the mounting mechanism includes a socket 4, where the socket 4 allows the insertion and removal of the pump, and provides structural support for the pump within the storage tank. In some embodiments of the present invention, the socket 4 is welded to the storage tank 1 and is constructed with thin-walled conduits and vacuum insulated to minimize heat leak to the storage tank 1.

A hydraulic drive system 5 configured to actuate the pump 3 and permit the isolation of heat and vibration away from the storage tank 1. The hydraulic drive system 5 can be used instead of a direct electric drive to allow the isolation of mechanical vibration from the storage tank 1. The hydraulic drive system 5 also allows separation of the heat generated from the electric motor away from the storage tank 1 by using hydraulically driven pumps with high pressure fluids to drive the pump. The hydraulic drive system affords the flexibility of installing the pump inside the liquefied gas storage tank without causing excessive heat leak or vibration, which are both critical to reduce liquefied fuel boil-off loss.

A heat exchanger 6 configured to be in fluid communication with a discharge end of the pump, and warm up the fuel. In some embodiments of the present invention, the heat exchanger used to warm up the liquefied fuel uses ambient air as the heating source. In some other embodiments of the present invention, the heat exchanger uses a heat transfer fluid to warm up the liquefied fuel. In some other embodiments of the present invention, the heat exchanger uses electricity as the heating source to warm up the liquefied fuel.

The heat exchanger 6 can be provided with multiple take-off points, e.g., bypass lines 10 and/or 11, for providing a bypass line where the first portion of fuel has different amounts of vaporization, e.g., to have temperatures between −250° C. and 30° C., to help meet the dispensing temperature target.

A thermal management system 7 configured to use a cold stream 10 bypassed from upstream (or stream 11 along other points) of the heat exchanger 6 to control the final temperature for vehicle filling. The thermal management system 7 can include a mixer, tank, or other means for mixing the cold stream with the warm stream of fuel. The thermal management system 7 can also include a controller 12 that monitors the temperature and/or pressure and/or flow rate to the dispenser 8 to control the first portion and/or the second portion of fuel.

A dispenser 8 with a control system, wherein the control system initiates vehicle fueling by coordinating the steps 10-50, and is capable of serving a plurality of vehicles (not shown) simultaneously and/or in succession through a nozzle 9. It is understood that the dispenser 8 can be used to control the hydraulic drive system 5 or other similar means to control the hydraulic drive system 5.

In some embodiments of the present invention, a single pump 3 with a large capacity is used to supply one or more dispensers 8, thus multiple vehicles of the same or different type (e.g. 35 MPa or 70 MPa) are filled at the same time. In some other embodiments of the present invention, multiple pumps are installed within each storage tank 1 to provide increased fuel flow for the refueling station.

In some embodiments of the present invention, the liquefied gas is liquid hydrogen or liquid natural gas.

Some embodiments of the present invention provide a computer readable storage medium that stores a computer program, wherein, the steps 10-50 are implemented when the computer program is performed by a computer.

Some embodiments of the present invention provide a computer program product which is stored in a non-transitory computer readable medium, wherein, the computer program product includes a computer program, and steps 10-50 are implemented when the computer program is performed by a computer.

Some embodiments of the present invention provide a system that includes the computer program product which is stored in a non-transitory computer readable medium, where, the computer program product includes a computer program that executes the steps 10-50 when performed locally or remotely on a computer, e.g., through an internet connection or wireless carrier signal.

The HRS as disclosed herein allows continuous vehicle filling until the LH2 stored in the storage tank is depleted without relying on a refrigeration system for cooling or the cascade tubes for storage capacity, where these two limitations in the state of the art HRS systems dictate how many vehicles or, alternatively, how many kilograms of hydrogen can be dispensed in one day (station capacity). Since it is more cost effective to increase the size of the LH2 storage tank (as opposed to including additional equipment), the dispensing equipment limitations are the only real limit on station capacity in kg/day or vehicles per day of the present invention.

In conclusion, some of the main benefits of the present invention are as follows:
  Permits underground storage of liquefied fuel in the soil, just as LPG and gasoline is stored today. The resulting arrangement reduces footprint, enhances safety due to the elimination of potential collision and puncture failures of the liquefied gas storage tank.
  Elimination of a refrigeration system which reduces capital and operational cost.
  Elimination of the cascade storage tanks which takes up space and requires capital costs.
  Allows lower energy consumption via liquid pumping rather than gas compression.
  Eliminates water cooling requirements for multi-stage gas compressors.
  Allows direct filling of vehicles without relying on high-pressure storage tanks used as buffers.
  Allows unlimited back-to-back filling by removing the limitation of storage capacity and refrigeration capacity.
  Allows a single pump to fuel multiple vehicles of the same or different type.
  Allows multiple pumps in a single LH2 storage tank to increase station throughput.
  Allows lower maintenance cost because of fewer equipment pieces and simplified setup.
  Allows overall lower cost of dispensing.
  Allows scale-up of the HRS to support hydrogen energy adoption.

The detailed description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. It being understood that various changes may be made in the function and arrangement of elements without departing from scope of the invention as defined by the claims. Such other examples are intended to be within the scope of the claims if they have structural elements that do not differ from the literal language of the claims, or if they include equivalent structural elements with insubstantial differences from the literal languages of the claims.

Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials, etc. described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The invention claimed is:

1. A method for dispensing a fuel comprising the steps:
   providing a non-petroleum fuel as a liquefied fuel to a storage tank;

increasing pressure of the liquefied fuel to a target pressure using a pump disposed within the storage tank;

bypassing a first portion of the liquefied fuel from the pump at least partially around a heat exchanger, wherein the first portion of the liquefied fuel comprising liquefied fuel that has been partially vaporized in the heat exchanger;

discharging a second portion of the liquefied fuel to a heat exchanger, said heat exchanger configured to warm the second portion of the liquefied fuel; and controlling a temperature of the liquefied fuel by combining the first portion and the second portion of the liquefied fuel without external refrigeration or a storage subsystem disposed between the pump and the dispenser.

2. The method according to claim 1, wherein the storage tank is underground.

3. The method according to claim 1, wherein the heat exchanger is a vaporizer configured to heat the liquefied fuel.

4. The method according to claim 1, wherein the liquefied fuel is liquid hydrogen or liquified natural gas.

5. The method according to claim 1, wherein an inlet of the pump is submerged in the liquefied fuel in the storage tank and disposed substantially at the bottom of said storage tank.

6. The method according to claim 1, wherein the first portion of the liquefied fuel is provided as a fraction between 5% to 95% of a total of the liquefied fuel from the pump.

7. The method according to claim 1, further comprising dispensing the combined first portion and second portion to at least one vehicle, and not comprising a storage subsystem.

8. A system for dispensing a fuel to a vehicle comprising:
at least one storage tank for storing a non-petroleum liquefied fuel;
at least one pump disposed within the storage tank, said at least one pump configured to provide the liquefied fuel by increasing pressure to a target pressure;
a heat exchanger configured to increase a temperature of the liquefied fuel from the at least one pump, wherein the heat exchanger comprises at least one take-off point, wherein said take-off point is configured to provide liquefied fuel that is at least partially vaporized in the heat exchanger;
a bypass line around the heat exchanger configured to receive a cold stream of the liquefied fuel as a first portion; and
a dispenser comprising a control system for dispensing the liquefied fuel at the target pressure and a target temperature without external refrigeration or a storage subsystem disposed between the pump and the dispenser,
wherein a second portion of the liquefied fuel is supplied to the heat exchanger to be heated.

9. The system according to claim 8, wherein the storage tank is directly buried underground.

10. The system according to claim 8, wherein the at least one pump is provided in a pump socket installed in the at least one underground storage tank.

11. The system according to claim 8, wherein the at least one pump includes a hydraulic drive system.

12. The system according to claim 8, wherein the heat exchanger is a vaporizer.

13. The system according to claim 8, further comprising a thermal management system for combining the first portion and the second portion to the target temperature.

14. The system according to claim 8, wherein at least two pumps are provided to supply the liquefied fuel to at least two vehicles, and the system does not comprise a storage subsystem.

* * * * *